(12) United States Patent
Bidari et al.

(10) Patent No.: US 12,354,078 B1
(45) Date of Patent: Jul. 8, 2025

(54) SYSTEMS AND METHODS FOR COMMUNICATING WITH NFC READERS

(71) Applicant: Block, Inc., Oakland, CA (US)

(72) Inventors: Emad Bidari, Toronto (CA); Mani Razaghi Kashani, Palo Alto, CA (US); Anthony Newpower, Edwards, CO (US); Abdullah Yeaser, San Francisco, CA (US)

(73) Assignee: Block, Inc., Oakland, CA (US)

( * ) Notice: Subject to any disclaimer, the term of this patent is extended or adjusted under 35 U.S.C. 154(b) by 378 days.

(21) Appl. No.: 18/092,021

(22) Filed: Dec. 30, 2022

(51) Int. Cl.
  *G06Q 20/32* (2012.01)
  *H01Q 1/22* (2006.01)

(52) U.S. Cl.
  CPC ....... *G06Q 20/3278* (2013.01); *H01Q 1/2216* (2013.01)

(58) Field of Classification Search
  CPC .................. G06Q 20/3278; H01Q 1/2216
  See application file for complete search history.

(56) References Cited

U.S. PATENT DOCUMENTS

| | | | | |
|---|---|---|---|---|
| 11,012,119 | B2 * | 5/2021 | Liu | H04B 5/266 |
| 2008/0302875 | A1 * | 12/2008 | Chien | G06K 7/0013 |
| | | | | 235/492 |
| 2010/0093412 | A1 * | 4/2010 | Serra | H04M 1/7246 |
| | | | | 455/575.8 |
| 2010/0182764 | A1 * | 7/2010 | Phillips | H05K 9/002 |
| | | | | 361/816 |
| 2012/0068908 | A1 * | 3/2012 | Lee | H01Q 1/40 |
| | | | | 343/873 |
| 2012/0122520 | A1 * | 5/2012 | Phillips | H04M 1/21 |
| | | | | 455/556.2 |
| 2012/0206302 | A1 * | 8/2012 | Ramachandran | H01Q 1/22 |
| | | | | 343/866 |
| 2014/0128132 | A1 * | 5/2014 | Cox, III | H04M 1/185 |
| | | | | 455/575.8 |
| 2014/0268519 | A1 * | 9/2014 | Huang | H04B 1/3888 |
| | | | | 361/679.01 |
| 2014/0300518 | A1 * | 10/2014 | Ramachandran | H01Q 5/371 |
| | | | | 343/702 |

(Continued)

FOREIGN PATENT DOCUMENTS

| | | | | |
|---|---|---|---|---|
| CN | 101043222 A | * | 9/2007 | ......... G06K 7/10178 |
| CN | 103595828 A | * | 2/2014 | |

(Continued)

*Primary Examiner* — Ashford S Hayles
(74) *Attorney, Agent, or Firm* — Polsinelli PC (57) ABSTRACT

A mobile NFC payment reader, such as a smartphone or tablet, has a casing for protecting the reader from damage. The casing also includes circuitry having at least two NFC antennas that are electrically coupled to each other and capable of wireless communication with an NFC antenna of the reader. One of the casing's antennas is positioned such that it is aligned with and close to the reader's antenna. The other antenna of the casing may be positioned at another location relatively far from the reader's antenna, thereby extending the range at which a payment device can communicate with the reader's antenna. Thus, a tap location for the reader may be established at a more convenient or intuitive location, as may be desired, without having to change the location of the reader's antenna.

20 Claims, 7 Drawing Sheets

(56) References Cited

U.S. PATENT DOCUMENTS

| | | | |
|---|---|---|---|
| 2015/0214993 A1* | 7/2015 | Huang | H04M 1/724092 |
| | | | 455/575.8 |
| 2016/0249157 A1* | 8/2016 | Fine | H01Q 1/248 |
| 2016/0259531 A1* | 9/2016 | Cho | G06Q 20/3278 |
| 2016/0315667 A1* | 10/2016 | Jensen | H04B 5/72 |
| 2017/0126672 A1* | 5/2017 | Jang | H04L 63/0492 |
| 2017/0237149 A1* | 8/2017 | Lee | G06F 1/1626 |
| | | | 361/679.21 |
| 2018/0165673 A1* | 6/2018 | Francis | H04W 4/80 |
| 2019/0199387 A1* | 6/2019 | Yang | A45C 11/182 |
| 2020/0112344 A1* | 4/2020 | Liu | H04B 5/79 |
| 2020/0286070 A1* | 9/2020 | Garrett | G06Q 20/363 |
| 2021/0367342 A1* | 11/2021 | Chiu | H02J 50/402 |

FOREIGN PATENT DOCUMENTS

| | | | | |
|---|---|---|---|---|
| CN | 103904424 A | * | 7/2014 | |
| CN | 104580571 A | * | 4/2015 | |
| CN | 204392337 U | * | 6/2015 | |
| CN | 107395838 A | * | 11/2017 | |
| CN | 208489895 U | * | 2/2019 | |
| GB | 2506213 A | * | 3/2014 | H01Q 1/243 |
| WO | WO-2013150192 A1 | * | 10/2013 | G06K 7/10237 |
| WO | WO-2016053222 A1 | * | 4/2016 | G06K 7/00 |

* cited by examiner

FIG. 5
(Front View)

FIG. 6
(Rear View)

SYSTEMS AND METHODS FOR COMMUNICATING WITH NFC READERS

TECHNICAL FIELD

Mobile devices, such as smartphones, are increasingly used as near field communication (NFC) payment readers for making contactless financial payments. Such NFC payment readers often have an embedded antenna for wirelessly communicating with a mobile payment device (e.g., a credit or debit card) using NFC protocols. To effectuate a payment, a user will often "tap" the payment reader by temporarily moving the payment device into close proximity (e.g., about 4.0 centimeters (cm) or less) of the payment reader. When the payment device is within communication range of the payment reader, the payment device may transmit payment data, such as a financial account number, for effectuating a payment. The payment reader may then use this payment data to submit a payment request to a payment server, which then approves or disapproves the requested payment based on the information provided by the payment reader.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

The present disclosure generally pertains to systems and methods for enhancing communication performance of NFC readers. In some embodiments, a mobile communication device, such as a smartphone, is configured to function as a mobile NFC payment reader by reading payment information from payment devices, such as credit or debit cards.

When a payment device taps a payment reader for a contactless financial payment, it is generally desirable for the payment data to be communicated quickly and reliably. Any misalignment between the antennas of the payment device and the payment reader can reduce communication performance (e.g., signal-to-noise ratio), resulting in data errors. This problem is sometimes exacerbated by the placement selection of the embedded antenna of the payment reader. In this regard, many mobile devices, such as smartphones, used as payment readers have a thin design but also have a relatively large battery, display screen, and circuit board, which have a tendency to absorb and degrade NFC signals. In an effort to mitigate these issues, a manufacturer of a mobile device may place the NFC antenna in a non-intuitive or inconvenient location, such as the back of the mobile device. In some cases, a user may not realize the NFC antenna is on the back of the mobile device and, thus, attempt to tap the mobile device on its front surface or other location that is relatively far from the device's NFC antenna or where communication performance is relatively poor, thereby increasing data errors or the time required to successfully communicate payment information.

In some embodiments of the present disclosure, a mobile payment reader (e.g., a smartphone) is inserted into and held by a casing that functions to protect the payment reader from damage. The casing is equipped with circuitry that comprises at least one NFC antenna, referred to herein as "near-end antenna," and at least one other NFC antenna, referred to herein as "far-end antenna," positioned some distance from the near-end antenna. The near-end antenna is positioned on the casing such that it is in close proximity to and aligned with an NFC antenna of the payment reader. Thus, there is very little performance degradation when wireless signals are communicated between the near-end antenna and the antenna of the payment reader 15. During a tap of the reader, a user may position a payment device such that the far-end antenna of the reader's casing is in close proximity to and aligned with the antenna of the payment device, and payment data is transmitted from the payment device through the antennas and circuitry of the casing to the payment reader. The antennas of the casing may serve as a repeater or relay for essentially extending the communication range between the antenna of the payment device and the antenna of the payment reader such that communication performance between the payment device and payment reader is improved at one or more tap locations.

In some embodiments, the far-end antenna of the casing is positioned at a location for which a user might intuitively or conveniently place a payment device when performing a tap. As an example, the far-end antenna may be positioned near a front surface of the payment reader and/or close to a certain edge of the payment reader, though other locations are possible in other embodiments. Thus, a user is more likely to better position the antenna of the payment device for reading by the payment reader relative to an embodiment that does not use a casing equipped with antennas as described herein. In some embodiments, the reader may be configured to display information that assists the user with better aligning the far-end antenna of the casing with the antenna of the payment device.

Figure 1:
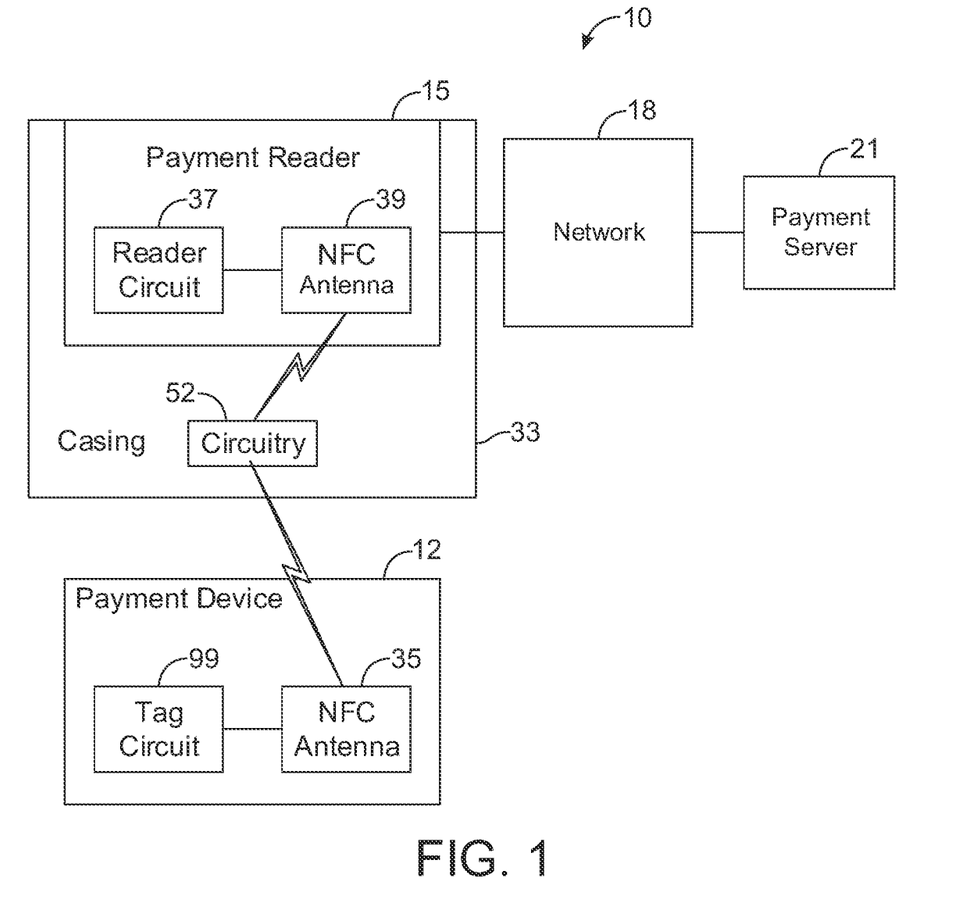
FIG. 1 is a block diagram illustrating an example embodiment of a payment reader and a payment device during a tap of the payment reader by the payment device.

FIG. 1 depicts an embodiment of a payment system 10 that may be used to effectuate financial payments. As shown by FIG. 1, the payment system 10 comprises a payment device 12 that is configured to wirelessly communicate payment information with a payment reader 15. In some embodiments, the payment device 12 is configured to communicate with the payment reader 15 using NFC, but other types of short-range protocols and communication techniques are possible. For illustrative purposes, it will be assumed hereafter unless otherwise indicated that the communication occurring between the payment device 12 and the payment reader 15 is NFC.

To communicate via NFC, the payment device 12 may be positioned sufficiently close (e.g., about 4.0 cm or less) to the payment reader 15 so that their NFC antenna circuits are inductively coupled. When the NFC antenna circuits of the payment device 12 and payment reader 15 are inductively coupled, load modulation may be used to communicate data. In this regard, the payment reader 15 may transmit a wireless carrier signal, and the payment device 12 may change the impedance of its antenna circuit in order to modulate the carrier signal with data. The payment reader 15 detects and demodulates the modulated signal in order to recover the data.

In some embodiments, the payment device 12 is implemented as an NFC-enabled credit or debit card, but other types of devices may be used to implement the payment device 12 in other embodiments. As an example, the payment device 12 may be implemented with an NFC-enabled smartphone that is configured to wirelessly transmit payment information to the payment reader 15. In yet other embodiments, other types of payment devices 12 may be used.

In some embodiments, as will be described in more detail below, the payment reader 15 comprises a mobile NFC mobile device, such as an NFC-enabled smartphone or tablet. In other embodiments, other types of payment readers are possible. As shown by FIG. 1, the payment reader 15 is communicatively coupled to at least one network 18, such as a cellular network and the Internet, and communicates with a remote payment server 21 through the network 18. During a payment transaction, the payment device 12 is configured to communicate payment information, such as a financial account number to be used for a payment, to the payment reader 15, which then processes the payment information to generate a payment request. The payment reader 15 transmits the payment request to the payment server 21, which may be owned or operated by a financial institution. The payment server 21 may then approve or disapprove the payment request. If the payment request is approved, funds may be transferred from a financial account identified by the payment information from the payment device 12 to another financial account, such as a financial account of a merchant providing a service or product to the user of the payment device 12.

As shown by FIG. 1, the payment reader 15 comprises a reader circuit 37 that is coupled to an NFC antenna 39. The reader circuit 37 is configured to communicate with other NFC devices, such as the payment device 12 shown by FIG. 1, via the antenna 39. In this regard, the reader circuit 37 may be configured to transmit from the antenna 39 an NFC carrier signal that may be load modulated by an NFC device in range of the antenna 39 in order to convey data to the reader circuit 37.

In some embodiments, the payment reader 15 is inserted into and held by a casing 33. Such casing 33 may cover a significant portion of the payment reader 15 and be designed to protect the payment reader 15 from damage. In some embodiments, the casing 33 is composed of a hard plastic material, but other types of materials (e.g., an elastomer or rubber) may be used. The casing 33 may partially cover the payment reader 15 (e.g., cover the back surface of the payment reader 15 but leave the front surface of the payment reader 15 exposed), or the casing 33 may completely encase the payment reader 15. If desired, the casing 33 may be watertight such that water is prevented from reaching the payment reader 15 if the payment reader 15 is inadvertently dropped into water or exposed to rain.

As shown by FIG. 1, the casing 33 comprises circuitry 52 that is configured to communicate with the antenna 39 and to also communicate with an antenna 35 of the payment device 12 so that the range in which the payment device 12 may successfully communicate with the payment reader 15 via the antenna 39 is increased. For example, the circuitry 52 may function as a repeater or relay that passes data between the antenna 39 of the payment reader 15 and the antenna 35 of the payment device 12. In some embodiments, the circuitry 52 may transfer a signal carrying payment data from one location of the casing 33 relatively far from the antenna 39 to another location of the casing 33 that is relatively near the antenna 39 where the data can be wirelessly transmitted to the antenna 39 via NFC, as will be described in more detail below.

Figure 2:
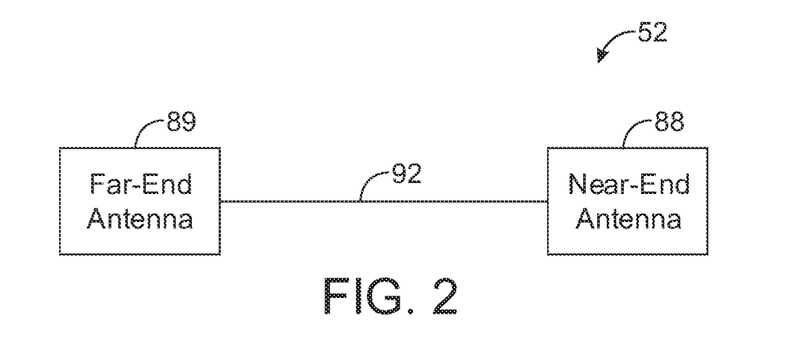
FIG. 2 is a block diagram illustrating an embodiment of circuitry for a casing of a payment reader, such as is depicted by FIG. 1.

Any of various configurations of the circuitry 52 (FIG. 1) of the casing 33 may be used in order to transfer a signal as described herein. FIG. 2 depicts an embodiment of the circuitry 52. The circuitry 52 of FIG. 2 has an NFC antenna 88, referred to herein as the "near-end antenna," that is positioned close to (e.g., about 4 cm or less) the antenna 39 of the payment reader 15 such that an NFC signal may be wirelessly communicated between the antennas 39, 88.

The circuitry 52 also has another NFC antenna 89, referred to herein as the "far-end antenna," that is positioned relatively far (e.g., greater than about 4.0 cm) from the antenna 39 of the payment reader 15. The far-end antenna 89 is optimized for NFC but may be too far from the antenna 39 of the payment reader 15 to directly communicate a wireless NFC signal with such antenna 39. The far-end antenna 89 is electrically coupled to the near-end antenna 88 via one or more conductive connections 92. In some embodiments, the connections 92 may be formed on a printed circuit board (not specifically shown) or a flex circuit that is attached to a surface of the casing 33, but other configurations of the connections 92 are possible in other embodiments. As an example, laser direct structuring or other manufacturing techniques may be used to etch or otherwise form conductive connections 92 into a surface of the casing 33.

The exemplary circuitry 52 shown by FIG. 2 is passive and is configured to passively transfer energy from one casing antenna 88, 89 to the other via the conductive connections 92. Thus, when the payment device 12 is positioned such that its antenna 35 is within wireless communication range of the far-end antenna 89 of the casing 33, communication between the payment device 12 and the payment reader 15 through the far-end antenna 89 and near-end antenna 88 is enabled. In this regard, when the payment device 12 is so positioned, the NFC carrier signal wirelessly transmitted by the reader circuit 37 and antenna 39 of the payment reader 15 is received by the near-end antenna 88 of the casing 33, and the connections 92 transfer the received energy of the carrier signal to the far-end antenna 89, which wirelessly emits such energy so that the carrier signal is received by the payment device 12. Thus, even though the antenna 35 of the payment device 12 is too far (e.g., greater than about 4.0 cm) from the antenna 39 of the payment reader 15 for direct wireless communication via NFC, the antennas 35, 39 are nevertheless inductively coupled to each other through the circuitry 52 of the casing 33 such that the payment device 12 is capable of load modulating the carrier signal. In some embodiments, the payment device 12 is configured to load modulate the carrier signal in order to transmit to the payment reader 15 payment data for a financial payment transaction as described above. In this regard, as shown by FIG. 1, the payment device 12 has a tag circuit 99 that is configured to load modulate an NFC carrier signal received by the antenna 35 in order to transmit payment data, as described herein.

Figure 3:
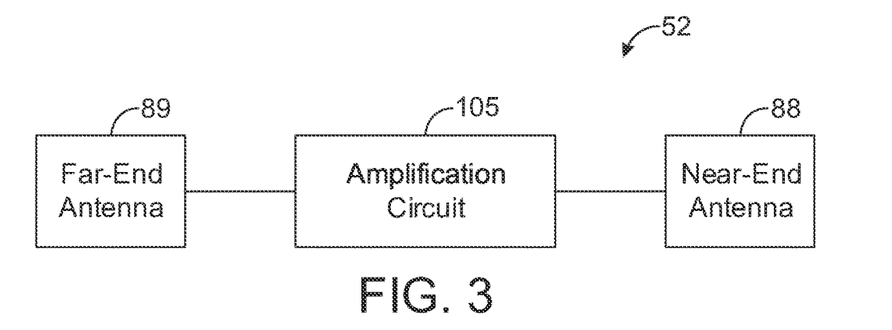
FIG. 3 is a block diagram illustrating an embodiment of circuitry for a casing of a payment reader, such as is depicted by FIG. 1.
Figure 4:
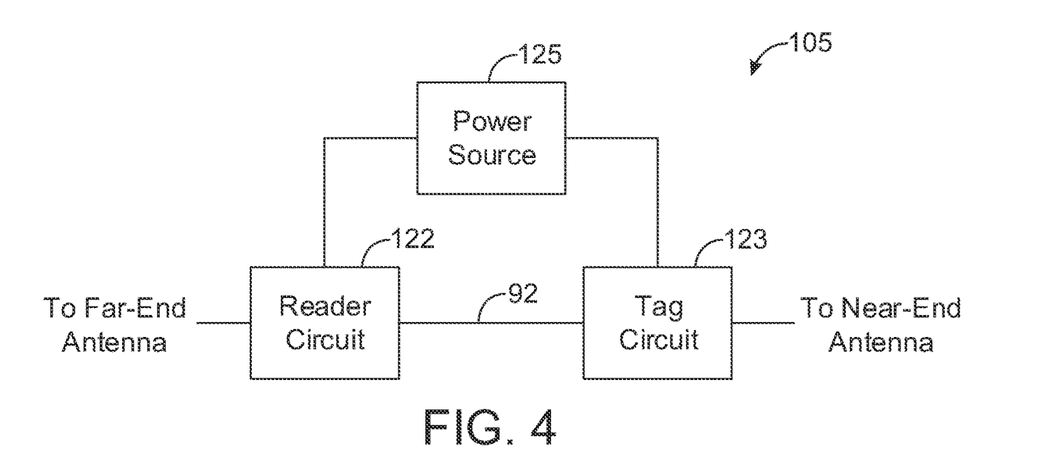
FIG. 4 is a block diagram illustrating an embodiment of an amplification circuit, such as is depicted by FIG. 3.

In other embodiments, other configurations of the circuitry 52 of the casing 33 are possible. For example, the circuitry 52 may include active components that amplify signals passing through the circuitry 52. FIG. 3 depicts an embodiment of circuitry 52 having an amplification circuit 105 between the far-end antenna 89 and the near-end antenna 88 for amplifying signals passing between the antennas 88, 89. In some embodiments, such amplification is achieved by regenerating the signals being communicated. FIG. 4 depicts such embodiment.

As shown by FIG. 4, the amplification circuit 105 may include a reader circuit 122 that is configured to emulate an NFC reader, such as the payment reader 15, and the amplification circuit 105 may include tag circuit 123 that is configured to emulate an NFC tag, such as the payment device 12. As shown by FIG. 4, the amplification circuit 105 may also include a power source 125, such as one or more batteries, that is configured to provide electrical power to the reader circuit 122 and the tag circuit 123. In some embodiments, the amplification circuit 105 may be electrically coupled to the electronics of the payment reader 15 and draw power from one or more batteries (not shown) of the payment reader 15, thereby obviating the need of a separate power source 125 on the casing 33. In other embodiments, it is possible for the power source 125 to include a rechargeable battery that is recharged via a conductive connection between the power source 125 and the payment reader 15 or via a wireless signal that is transmitted by the payment reader 15.

In operation, the reader circuit 122 is configured to transmit a wireless NFC carrier signal via the far-end antenna 89 and to receive and decode payment data transmitted to the far-end antenna 89 by the payment device 12 via load modulation of the carrier signal. The reader circuit 122 is further configured to transmit such payment data via conductive connections 92 to the tag circuit 123, which then load modulates the NFC carrier signal transmitted from the antenna 39 of the payment reader 15 in order to transmit the payment data to the reader circuit 37 of the payment reader 15.

Notably, in both embodiments shown by FIGS. 2 and 3, the presence of the circuitry 52 is transparent to the payment reader 15 and the payment device 12. However, use of the circuitry 52 permits the payment device 12 to successfully communicate payment data with the payment reader 15 at locations for which communication with the payment reader 15 via NFC would not otherwise be possible without the presence of the circuitry 52. Thus, the circuitry 52 allows the payment device 12 to be positioned at a location that is relatively far from the antenna 39 of the payment reader 15 while still permitting successful communication via NFC.

As an example, assume for illustrative purposes that the antenna 39 is located near the back surface of the payment reader 15 such that, in the absence of the circuitry 52, it would be ideal for a user to tap the back of the payment reader 15 with the payment device 12 in performance of a payment transaction. In such embodiment, the near-end antenna 88 of the casing 33 may be positioned near the antenna 39 of the payment reader 15 and adjacent to the back surface of the payment reader 15 such that the back surface of the payment reader 15 is between the antennas 39, 88. However, the far-end antenna 89 may be positioned adjacent to the front surface of the payment reader 15 such that a suitable location for tapping the payment reader 15 with the payment device 12 is at the front of the payment reader 15. Moreover, the far-end antenna 89 may be positioned at any desired location of the casing 33 such that a suitable tap location may be extended to any location along the casing 33, such as a location that is more convenient or intuitive for tapping, as will be described in more detail below.

Figure 5:
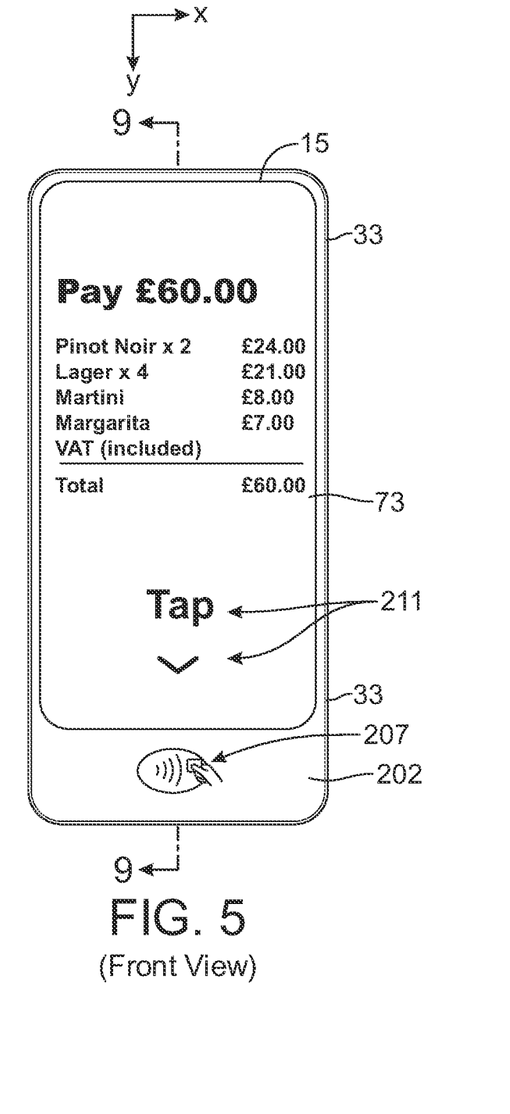
FIG. 5 is a front view of a payment reader, such as is depicted by FIG. 1, within a casing.
Figure 6:
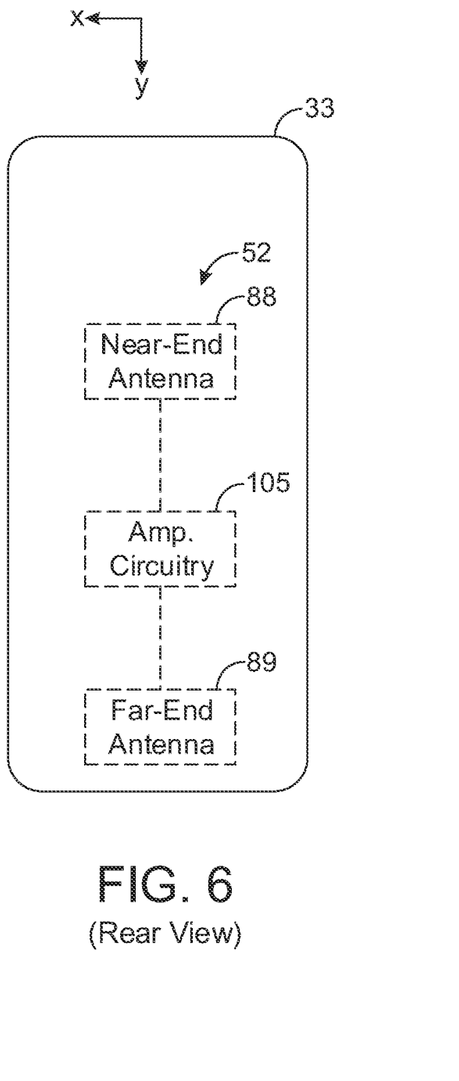
FIG. 6 is a rear view of the payment reader and casing depicted by FIG. 5.

FIGS. 5 and 6 show an embodiment of a payment reader 15 (which in the embodiment depicted by FIG. 5 is a smartphone) positioned within and held by a casing 33. In the embodiment depicted by FIGS. 5 and 6, the casing 33 partially surrounds the payment reader 15 leaving a display screen 73 on the front of the payment reader 15 exposed so that the user can see information displayed by the display screen 73 and also touch the display screen 73 to provide inputs. In some embodiments, the casing 33 may have a transparent film that covers the display screen 73 in order to help make the casing 33 more watertight or to protect the display screen 73 while allowing a user to view information from the display screen 73 through the transparent film.

The near-end antenna 88 is positioned such that it is aligned with (e.g., located at about the same x and y-coordinates as the antenna 39 (FIG. 1) of the payment reader 15. In the embodiment depicted by FIG. 6, the near-end antenna 88 is positioned near the middle of the payment reader 15, but other locations of the near-end antenna 88 are possible. Note that the antenna 39 of the payment reader 15 may be positioned underneath the display screen 73 such that the signals communicated between the antenna 39 of the payment reader 15 and the near-end antenna 88 on the casing 33 do not pass through the display screen 73. Thus, the near-end antenna 88 is optimally positioned on the backside of the payment reader 15 such that the display screen 73 does not significantly interfere with communication between the antennas 39, 88.

In the embodiment depicted by FIGS. 5 and 6, a bottom portion 202 of the casing 33 extends below the payment reader 15 (in the y-direction) and houses the far-end antenna 89. In other implementations, the bottom portion 202 of the casing 33 may extend above the payment reader 15 (in the y-direction), to the right of the payment reader 15 (in the x-direction), or to the left of the payment reader 15 (in the x-direction). Further, the bottom portion 202 of the casing 33 includes a marking 207 that is aligned with (in the x and y-directions) with the far-end antenna 89, noting that the far-end antenna 89 is embedded in the casing 33 and, thus, is hidden in FIGS. 5 and 6. The user may use the marking 207 as a reference for positioning a payment device 12 (FIG. 1) relative to the reader 15 during a tap. In this regard, the user may position the payment device 12 such that the antenna 35 of the payment device 12 is aligned with (in the x and y-directions) and close to the marking 207 and, thus, the far-end antenna 89 that is embedded in the casing 33.

In some embodiments, the payment reader 15 may be configured to display one or more markings 211 on the display screen 73 for assisting the user with positioning of a payment device 12 during a tap of the reader 15. In the embodiment depicted by FIG. 5, a displayed marking 211 includes the word "Tap" that is positioned near an arrow that points to the marking 207 suggesting to the user that he or she should tap the reader 15 at a location below (in the y-direction) the arrow where the marking 207 is located. In other embodiments, other types of markings 207, 211 may be used.

Notably, the embodiment shown by FIGS. 5 and 6 allows the user to tap the front of the payment reader 15 below (in the y-direction) the display screen 73 even though the antenna 39 of the payment reader 15 may be located on the back of the payment reader 15 underneath the display screen 73. Such a tap location may be more intuitive or convenient for a user of the payment device 12 such that the user is more likely to tap the reader 15 at a location that provides good communication with the antenna 39 of the payment reader 15, thereby reducing communication errors.

Specifically, when the user taps his or her payment device 12, at the location of the marking 207, a high quality NFC wireless connection is established between the antenna 35 of the payment device 12 and the far-end antenna 89 of the casing 33. Further, payment data from the payment device 12 is transferred from the far-end antenna 89 to the near-end antenna 88 and is received by the antenna 39 of the payment reader 15.

In this regard, for an embodiment in which the circuitry 52 of the casing 33 is passive, such as is shown by FIG. 2, energy from the carrier signal transmitted by the antenna 39 of the payment reader 15 is transferred through the circuitry 52, including specifically the near-end antenna 88 and the far-end antenna 89, to the antenna 35 of the payment device 12 such that the antennas 35 and 39 are inductively coupled through the circuitry 52 of the casing 33. Thus, the payment device 12 may perform load modulation of the carrier signal to transfer payment data from the payment device 12 through the circuitry 52 of the casing 33 to the antenna 39 of the payment reader 15.

For an embodiment in which the circuitry 52 of the casing 33 has active components, such as is shown by FIG. 4, the far-end antenna 89 may be coupled to the reader circuit 122, which is configured to emulate an NFC reader, as described above. Specifically, the payment device 12 may perform load modulation of a carrier signal transmitted by the reader circuit 122 from the far-end antenna 89 in order to transfer payment data from the payment device 12 to the reader circuit 122 through the antennas 35, 89. Such payment data may then be transmitted from the reader circuit 122 to the tag circuit 123, which then emulates an NFC tag to transfer the payment data to the antenna 39 of the payment reader 15. Specifically, the tag circuit 123 may perform load modulation of a carrier signal transmitted from the antenna 39 of the payment reader 15 in order to transfer the payment data to the payment reader 15 through the antennas 39, 88.

Figure 7:
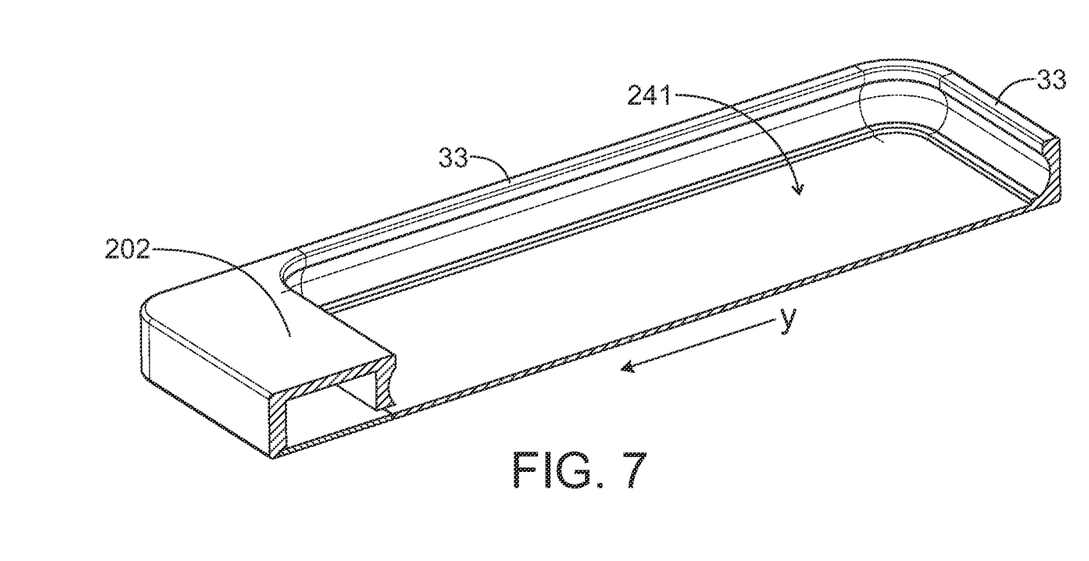
FIG. 7 is a cross-sectional view of the casing depicted by FIG. 5 with a near-end antenna, a far-end antenna, and associated circuitry removed for illustrative purposes.
Figure 8:
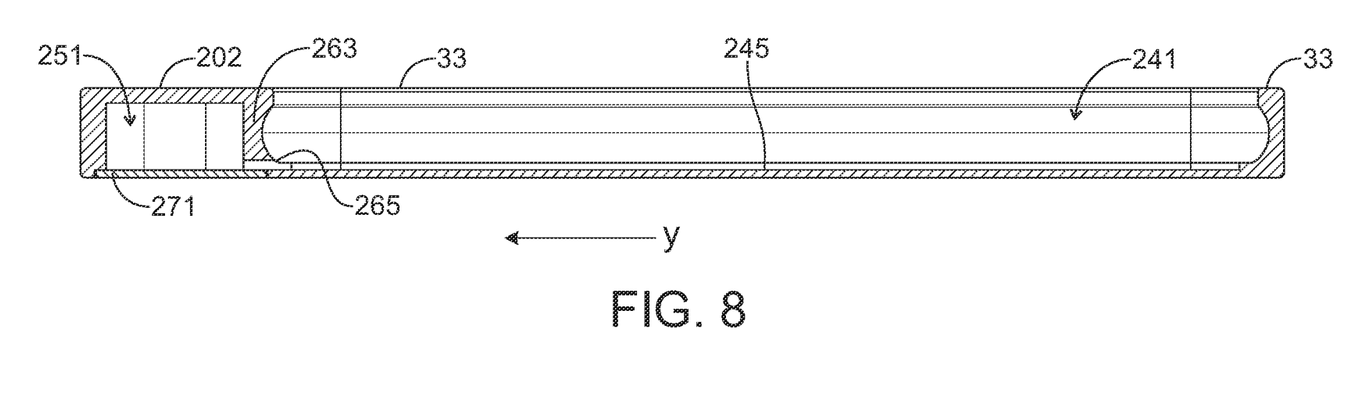
FIG. 8 is a cross-sectional view of the casing depicted by FIG. 7.
Figure 9:
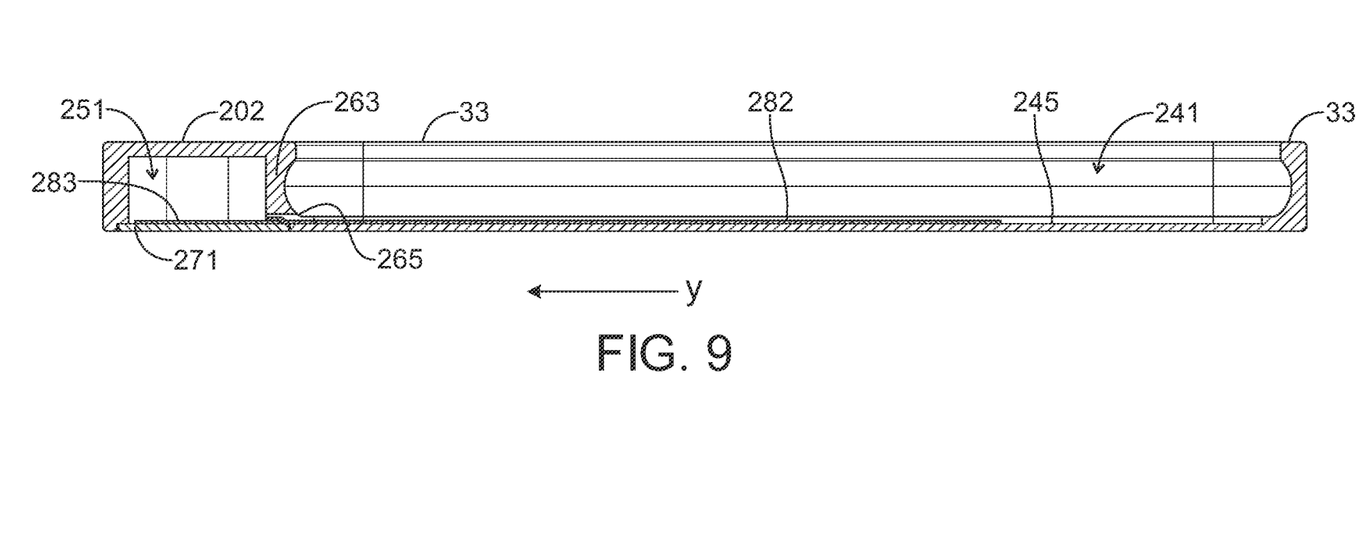
FIG. 9 is a cross-sectional view of the casing depicted by FIG. 8 with the near-end antenna, far-end antenna, and associated circuitry shown.

FIGS. 7 and 8 depict cross-sectional views of the casing 33 shown by FIGS. 5 and 6. As shown by these figures, the casing 33 forms a cavity 241 in which the payment reader 15 (not shown in FIGS. 7 and 8) may be positioned. As shown by FIG. 9, at least a portion of the circuitry 52, including the near-end antenna 88, may be formed on an inner surface 245 of the casing 33 that faces the back of the payment reader 15 when the payment reader 15 is positioned within the cavity 241. That is, the near-end antenna 88 may face and be close to the back of the payment reader 15 thereby improving the wireless communication connection between the near-end antenna 88 and the antenna 39 of the payment reader 15.

In addition, the bottom portion 202 of the casing 33 forms a cavity 251 in which the far-end antenna 89 may be positioned. By locating the far-end antenna 89 in the cavity 251 below (in the y-direction) the payment reader 15, it is possible for the user to tap a payment device 12 on the front, back, or bottom of the reader portion 202 without requiring the signals communicated in the tap to pass through the display screen 73 or other components (e.g., a battery or PCB) of the payment reader 15 that absorb a significant amount of energy, thereby improving communication performance. In this regard, as described above, payment data may be transmitted directly from the payment device 12 to the far-end antenna 89, pass through the circuitry 52, and then be transmitted directly from the near-end antenna 88 to the antenna 39 of the payment reader 15 without passing through the display screen 73 or other components (e.g., a battery or PCB) of the payment reader 15 that absorb a significant amount of energy.

It should be emphasized, however, that the locations of the near-end antenna 88 and the far-end antenna 89 in FIGS. 5 and 6 are exemplary, and it is possible for the antennas 88, 89 to be positioned at other locations of the casing 33 as may be desired. As an example, it is possible to position the far-end antenna 89 along a side or top edge of the payment reader 15. In addition, it is possible for multiple far-end antennas to be positioned at different locations of the casing 33 and electrically coupled to the near-end antenna 89, as described above for the far-end antenna 88 shown by FIGS. 2 and 3, to increase the number of tap locations that can be used to enable communication between the payment device 12 and the payment reader 15.

In addition, there are various techniques that may be used to manufacture or assemble the payment reader 15. Referring to FIG. 8, the casing 33 may have an inner wall 263 that separates the cavity 251 for the far-end antenna 89 and the cavity 241 for the payment reader 15. The presence of such wall 263 may help to hold the payment reader 15 in place such that there is very little or no relative movement between the payment reader 15 and casing 33. As shown by FIG. 8, a gap 265 may exist in the wall 263 to permit at least part of the casing circuitry 52 to pass. As an example, a flex circuit 282 that includes the near-end antenna 88 may be formed or otherwise positioned on the inner surface 245 and pass through the gap 265. Also, a removable cap 271 may have a flex circuit 283 formed or otherwise positioned on the inner surface of the cap 271. By attaching the cap 271 to the casing 33, as shown by FIG. 9, the flex circuit 283 on the cap 271 may be electrically coupled to the flex circuit 282 on the inner surface 245 such that the far-end antenna 89 is electrically coupled to the near-end antenna 88.

Note that having the far-end antenna 89 positioned on a removable cap 271 permits the far-end antenna 89 to be easily replaced or for a particular type of far-end antenna 89 to be used without having to change the design of the other portions of the casing 33. In some embodiments, the cap 271 is dimensioned to snugly fit within a slot of the casing 33 such that frictional forces between the cap 271 and the casing 33 hold the cap 271 in place. Thus, the cap 271 can be added to the casing 33 by simply pushing the cap 271 by hand, and the cap 271 can be removed from the casing 33 by pulling the cap 271 by hand. In other embodiments, the cap 271 may be threaded so that it can be screwed into the casing 33, and yet other techniques for attaching the cap 271 to the casing 33 are possible in other embodiments.

In operation, assume that the payment reader 15 depicted by FIGS. 5 and 6 is to be used for a financial payment transaction. A user of the reader 15 (e.g., a merchant involved in the payment transaction) may provide inputs to the payment reader 15 indicating that a payment transaction is desired and also indicating details of the payment transaction, such as the amount of funds to be transferred. The payment reader 15 may also be configured to store certain information about the transaction, such as an account number to be used for receiving the funds and other details, such as information identifying the merchant or other user who is to receive the funds.

In response to one or more inputs indicative of the transaction, the payment reader 15 is configured to display on the display screen 73 a graphical user interface (GUI) for the payment transaction. Such GUI may include information about the transaction, such as the name or other identification information of the merchant, the name or other identifier of a product or service being purchased, and the amount of funds to be transferred. The GUI also may include a marking 211 (FIG. 5) for assisting a user in finding a good tap location on the reader 15.

Using one or more of the markings 207 or 211 as a reference, a user may tap the reader 15 with a payment device 12 by positioning the payment device 12 such that its antenna 35 is aligned with and brought within close proximity (e.g., about 4.0 cm or less) of the far-end antenna 89. Thus, the antenna 35 is positioned within the electromagnetic field of a carrier signal transmitted by the far-end antenna 89, and the payment device 12 load modulates the carrier signal to transmit payment data to the far-end antenna 89, as shown by block 301 of FIG. 10. Note that the carrier signal may be generated by the reader circuit 37 of the payment reader 15 (e.g., when the circuitry 52 is passive) or may be generated by the reader circuit 122 of the circuitry 52 (e.g., when the circuitry 52 includes active components).

The payment data transmitted from the payment device 12 may include information for enabling payment of the requested funds. As an example, the payment data may include an account number of a financial account from which the funds are to be withdrawn for the payment and other information that may be used to authenticate or identify the user associated with such account.

Figure 10:
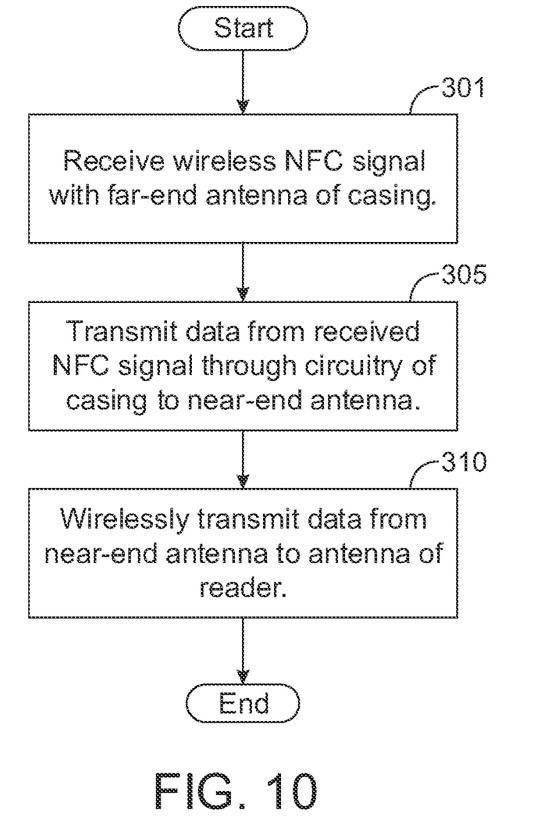
FIG. 10 is a flow chart illustrating a method for transmitting data to a payment reader, such as is depicted by FIG. 1, through circuitry of a casing coupled to the payment reader.

The payment data passes through the circuitry 52 of the casing 33 (including the far-end antenna 89 and the near-end antenna 88) and ultimately is received by the antenna 39 of the payment reader 15, as shown by blocks 305 and 310 of FIG. 10. In this regard, as noted above, the circuitry 52 can be passive such that the antenna 35 of the payment device 12 is inductively coupled to and can communicate NFC signals with the antenna 39 of the payment reader 15 through the circuitry 52. In such embodiment, the range for NFC is extended by the presence of the circuitry 52 such that the antennas 35, 39 can be separated by distances greater than about 4.0 cm. In other embodiments, the circuitry 52 may include an amplification circuit 105 that allows for even greater distances.

The reader circuit 37 is configured to process the NFC signal received by the antenna 39 to recover the payment data transmitted by the payment device 12. The payment reader 15 may use such payment data to generate a payment request and transmit the payment request to the payment server 21. If the payment request is approved, the payment server 21 causes the requested funds to be transferred from the account identified by the payment data to the account associated with the merchant. Information indicating whether the payment request is approved or denied may be transmitted by the payment server 21 to the payment reader 15, which may then display information indicating whether the payment request has been approved.

Use of the circuitry 52 for communication of the payment data, as described above, allows a successful tap to occur at a location that is relatively far (e.g., greater than 4.0 cm) from the antenna 39 of the payment reader 15. Thus, regardless of the location of the antenna 39, the tap location can be moved to or established at a more convenient or intuitive location, such as on the front of the payment reader 15, without having to change the configuration of the payment reader 15 or move the location of the antenna 39.

Note that, during the tap, the payment reader 15 may be configured to transmit data, such as acknowledgements, requests for information, or other information, to the payment device. In such case, the reader circuit 37 of the payment reader 15 load modulates a carrier signal with the data to be transmitted to the payment device 12 and wirelessly transmits the modulated carrier signal from the antenna 39. Such modulated carrier signal is received via the near-end antenna 88, as shown by block 331 of FIG. 11.

Figure 11:
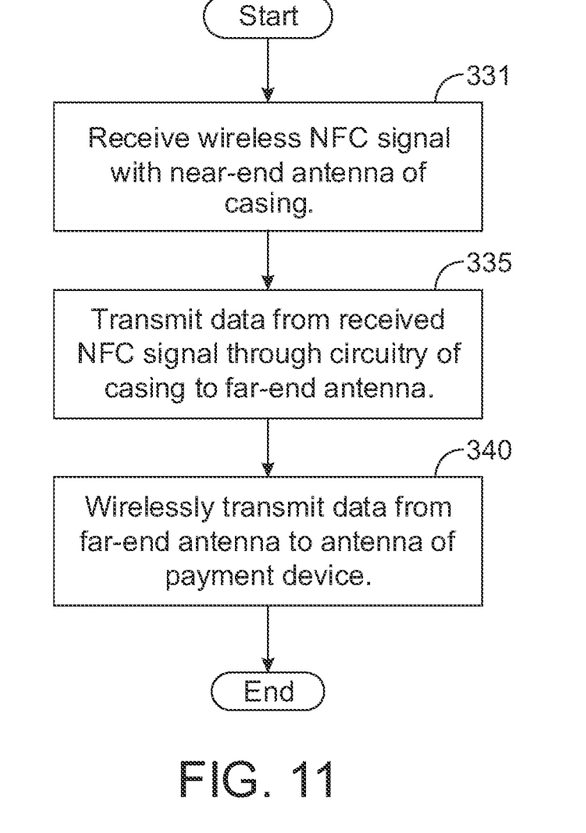
FIG. 11 is a flow chart illustrating a method for transmitting data from a payment reader, such as is depicted by FIG. 1, through circuitry of a casing coupled to the payment reader.

The data passes through the circuitry 52 of the casing 33 (including the near-end antenna 88 and the far-end antenna 89) and ultimately is received by the antenna 35 of the payment device 12, as shown by blocks 335 and 340 of FIG. 11. In this regard, as noted above, the circuitry 52 can be passive such that the modulated carrier signal from the payment reader 15 passes through the circuitry 52 and is wirelessly emitted from the far-end antenna 89. In such embodiment, the range for NFC is extended by the presence of the circuitry 52 such that the antennas 35, 39 can be separated by distances greater than about 4.0 cm. In other embodiments, the circuitry 52 may include an amplification circuit 105 that allows for even greater distances.

As an example, the tag circuit 123 (FIG. 5) may recover the data transmitted from the payment reader 15 to the near-end antenna 88, and the reader circuit 122 may retransmit such data to the payment device 12 through the far-end antenna 89. Specifically, the reader circuit 122 may generate a carrier signal and modulate the carrier signal with the data recovered by the tag circuit 123. Such modulated carrier signal generated by the reader circuit 122 may then be wirelessly transmitted from the far-end antenna 89 and received by the tag circuit 99 of the payment device 12, which then recovers the data from the received signal. Thus, data may be communicated in both directions through the circuitry 52 of the casing 33 as may be desired.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A near field communication (NFC) system, comprising:
a mobile payment reader having a reader circuit coupled to a first NFC antenna, wherein the mobile payment reader has a front surface and a back surface opposite of the front surface, and wherein at least a portion of the front surface forms a display screen; and
a casing coupled to the mobile payment reader, the casing having at least a first portion extending from the mobile payment reader and a second portion covering at least partially the back surface of the mobile payment reader, the casing having circuitry comprising a second NFC antenna positioned on the second portion of the casing and a third NFC antenna positioned on the first portion of the casing, the third NFC antenna electrically coupled to the second NFC antenna by at least one conductive connection such that payment data carried by an NFC signal from a payment device and received by the third NFC antenna is transmitted to the second NFC antenna by the at least one conductive connection and is wirelessly transmitted by the second NFC antenna of the casing to the first NFC antenna of the mobile payment reader through the back surface of the mobile payment reader.

2. The NFC system of claim 1, wherein the circuitry is passive.

3. The NFC system of claim 1, wherein the circuitry is configured to regenerate the NFC signal received by the third NFC antenna.

4. The NFC system of claim 1, wherein the circuitry comprises a reader circuit configured to emulate a reader for receiving the payment data from the payment device, and wherein the circuitry comprises a tag circuit configured to emulate a tag for transmitting the payment data to the first NFC antenna.

5. A near field communication (NFC) system, comprising:
a casing coupled to a mobile reader that includes a reader circuit coupled to a first NFC antenna, the casing having circuitry comprising a second NFC antenna and a third NFC antenna, the third NFC antenna electrically coupled to the second NFC antenna by at least one conductive connection such that data carried by an NFC signal received by the third NFC antenna is transmitted to the second NFC antenna by the at least one conductive connection and is wirelessly transmitted by the second antenna of the casing to the first NFC antenna of the mobile reader.

6. The NFC system of claim 5, wherein the mobile reader is a mobile payment reader, and wherein the data comprises payment data for a payment transaction.

7. The NFC system of claim 5, wherein the circuitry is passive.

8. The NFC system of claim 5, wherein the circuitry is configured to regenerate the NFC signal received by the third NFC antenna.

9. The NFC system of claim 5, wherein the circuitry comprises a reader circuit configured to transmit a first carrier signal from the third NFC antenna and to recover the data from the first carrier signal, wherein the circuitry comprises a tag circuit configured to load modulate a second carrier signal with the data, and wherein the second carrier signal is transmitted from the first NFC antenna to the second NFC antenna.

10. The NFC system of claim 5, wherein the mobile reader has a front surface and a back surface opposite of the front surface, wherein at least portion of the front surface forms a display screen, wherein the casing has a first portion extending from the mobile reader and a second portion at least partially covering the back surface of the mobile reader, wherein the second NFC antenna is positioned on the second portion of the casing, and wherein the third NFC antenna is positioned on the first portion of the casing.

11. The NFC system of claim 5, wherein the mobile reader is positioned within a first cavity of the casing.

12. The NFC system of claim 11, wherein the third NFC antenna is positioned on an inner surface of the casing facing the mobile reader.

13. The NFC system of claim 11, wherein the second NFC antenna is positioned within a second cavity of the casing.

14. The NFC system of claim 13, wherein the casing has a wall separating the first cavity and the second cavity, and wherein the at least one conductive connection passes through a gap in the wall.

15. A near field communication (NFC) method, comprising:
receiving an NFC carrier signal transmitted by a first NFC antenna of a mobile reader with a second NFC antenna of a casing coupled to the mobile reader, the casing having a third NFC antenna electrically coupled to the second NFC antenna by at least one conductive connection of the casing;
receiving, with the third NFC antenna, an NFC signal carrying data;
transmitting the data from the third NFC antenna to the second NFC antenna via the at least one conductive connection; and
wirelessly transmitting the data from the second NFC antenna to the first NFC antenna of the mobile reader.

16. The method of claim 15, wherein the mobile reader is a mobile payment reader, and wherein the data comprises payment data for a payment transaction.

17. The method of claim 15, wherein the transmitting the data from the third NFC antenna to the second NFC antenna is performed by passive circuitry of the casing, the passive circuitry comprising the at least one conductive connection.

18. The method of claim 15, wherein the transmitting the data from the third NFC antenna to the second NFC antenna comprises regenerating the NFC signal received by the third NFC antenna.

19. The method of claim 15, further comprising recovering the data from the NFC signal received by the third NFC antenna, and wherein the wirelessly transmitting the data from the second NFC antenna to the first NFC antenna comprises load modulating the NFC carrier signal with the data.

20. The method of claim 15, wherein the mobile reader is positioned within a first cavity of the casing, and wherein the third NFC antenna is positioned on an inner surface of the casing facing the mobile reader.

* * * * *